(12) United States Patent
Changping

(10) Patent No.: US 8,067,485 B2
(45) Date of Patent: Nov. 29, 2011

(54) MASTERBATCH AND POLYMER COMPOSITION

(75) Inventor: Chen Changping, Jiangsu (CN)

(73) Assignee: Biograde (Hong Kong) Pty Ltd, Hong Kong (CN)

( * ) Notice: Subject to any disclaimer, the term of this patent is extended or adjusted under 35 U.S.C. 154(b) by 127 days.

(21) Appl. No.: 12/375,435

(22) PCT Filed: Jul. 24, 2007

(86) PCT No.: PCT/AU2007/001027
§ 371 (c)(1),
(2), (4) Date: Apr. 21, 2009

(87) PCT Pub. No.: WO2008/011668
PCT Pub. Date: Jan. 31, 2008

(65) Prior Publication Data
US 2009/0312456 A1 Dec. 17, 2009

(30) Foreign Application Priority Data
Jul. 28, 2006 (AU) ................................ 2006904095

(51) Int. Cl.
*C08J 3/20* (2006.01)
*C08J 3/22* (2006.01)
*C08G 63/00* (2006.01)

(52) U.S. Cl. ........................... 523/351; 527/311

(58) Field of Classification Search .................. 527/311; 523/351
See application file for complete search history.

(56) References Cited

U.S. PATENT DOCUMENTS

| | | | | |
|---|---|---|---|---|
| 2,843,553 A * | 7/1958 | Wenzelberger | ............... | 525/54.3 |
| 4,656,206 A | 4/1987 | Carter | | |
| 5,162,392 A * | 11/1992 | Wool et al. | .................... | 523/128 |
| 5,280,089 A * | 1/1994 | DeGraaf et al. | ............... | 525/445 |
| 5,362,777 A * | 11/1994 | Tomka | ............... | 524/47 |
| 5,550,177 A * | 8/1996 | Fanta et al. | ...................... | 524/47 |
| 5,817,728 A * | 10/1998 | Higuchi et al. | ............... | 527/300 |
| 5,854,345 A * | 12/1998 | Xu et al. | .................... | 525/54.24 |
| 6,117,925 A * | 9/2000 | Tomka | ............... | 524/47 |
| 6,214,907 B1* | 4/2001 | Tomka | ............... | 524/47 |
| 6,319,576 B1* | 11/2001 | Rule et al. | .................... | 428/35.7 |
| 6,350,822 B1* | 2/2002 | Van Diepen et al. | ........ | 525/444 |
| 6,462,105 B1 | 10/2002 | Kuroki et al. | | |
| 6,506,824 B1* | 1/2003 | Bastioli et al. | ............... | 524/47 |
| 6,517,933 B1* | 2/2003 | Soane et al. | .................... | 428/221 |
| 6,863,988 B2* | 3/2005 | Tibbitt et al. | ............... | 428/480 |
| 7,265,188 B2* | 9/2007 | Autran | .................... | 525/439 |
| 2001/0039303 A1* | 11/2001 | Loercks et al. | ............... | 524/47 |
| 2002/0094444 A1 | 7/2002 | Nakata et al. | | |
| 2002/0136848 A1 | 9/2002 | Yoshii et al. | | |
| 2003/0119949 A1* | 6/2003 | Favis et al. | .................... | 524/47 |
| 2006/0036029 A1* | 2/2006 | Tomko et al. | ............... | 525/54.2 |
| 2006/0111511 A1* | 5/2006 | Narayan et al. | ............... | 525/54.2 |
| 2006/0235113 A1* | 10/2006 | Dorgan et al. | ............... | 524/13 |
| 2007/0079945 A1* | 4/2007 | Noda et al. | ............... | 162/157.1 |
| 2007/0082573 A1* | 4/2007 | Noda et al. | ............... | 442/361 |
| 2007/0082981 A1* | 4/2007 | Noda et al. | ............... | 524/47 |
| 2007/0082982 A1* | 4/2007 | Noda et al. | ............... | 524/47 |
| 2008/0108578 A1* | 5/2008 | Le Hen Ferrenbach et al. | ........................ | 514/23 |
| 2008/0255267 A1* | 10/2008 | Domb et al. | ............... | 523/124 |
| 2009/0075845 A1* | 3/2009 | Abad et al. | ............... | 507/117 |
| 2010/0226960 A1* | 9/2010 | Chudzik et al. | ............... | 424/426 |

FOREIGN PATENT DOCUMENTS

| | | | |
|---|---|---|---|
| WO | WO 02/059198 A1 | 8/2002 | |
| WO | WO 2007/012142 A1 | 2/2007 | |

* cited by examiner

*Primary Examiner* — Mark Eashoo
*Assistant Examiner* — Liam Heincer
(74) *Attorney, Agent, or Firm* — Arent Fox LLP

(57) ABSTRACT

The present invention relates to a method of preparing a biodegradable polymer composition, said method comprising melt mixing a first biodegradable polyester and a masterbatch, wherein said masterbatch has been formed separately by melt mixing in the presence of a transesterification catalyst a polysaccharide, a second biodegradable polyester and a biodegradable polymer having pendant carboxylic acid groups.

13 Claims, No Drawings

MASTERBATCH AND POLYMER COMPOSITION

CROSS-REFERENCE TO RELATED APPLICATION

This application is a National Stage entry of International Application No. PCT/AU2007/001027, filed Jul. 24, 2007, which claims priority to Australian patent Application No. 2006904095, filed Jul. 28, 2006, the disclosure of the prior applications is hereby incorporated in their entirety by reference.

FIELD OF THE INVENTION

The present invention relates generally to biodegradable polymer compositions. In particular, the invention relates to a method of preparing a biodegradable polymer composition, to the use of a masterbatch in the manufacture of the polymer composition, to a method of preparing the masterbatch, and to the masterbatch.

BACKGROUND OF THE INVENTION

The disposal of consumer waste has become a significant problem in many industrialised countries. For example, there are relatively few sites that remain available for landfill in places such as Europe and Japan. A considerable volume of consumer waste is made up of polymeric material, and there has been a concerted effort to introduce polymer recycling strategies to reduce such polymer waste going to landfill. However, unlike other materials such as glass, wood and metal, the recycling of polymers can be problematic. For example, polymer recycling techniques typically require the polymers to be sorted according to their chemical composition. However, due to the diverse array of different commercial polymers it can be difficult to separate polymer materials from the waste stream in this manner. Furthermore, most polymer recycling techniques involve a melt processing stage which can reduce the physical and mechanical properties of the polymer. Recycled polymers therefore tend to have inferior properties and this can limit the range of applications in which they can be employed.

Apart from problems associated with recycling waste polymer materials, the majority of polymers currently being used are derived from petroleum-based products, making their long-term manufacture unsustainable.

In response to these issues, there has been a marked increase in research directed toward developing biodegradable polymers that can at least in part be manufactured using renewable resources. Unlike conventional polymers, biodegradable polymers can be more readily degraded through the action of microorganisms to produce low molecular weight products that present little, if any, environmental concern. Furthermore, through the action of biodegradation the volume occupied by such polymers in waste streams is significantly reduced.

Much of the research to-date in the field of biodegradable polymers has focussed on utilising naturally occurring biopolymers such as polysaccharides. Perhaps the most widely studied polysaccharide in this regard is starch. Starch is a particularly suitable bio-polymer in that it is derived from renewable resources (i.e. plant products), readily available and relatively inexpensive. However, the physical and mechanical properties of starch in its native form are relatively poor compared with those of conventional petroleum based (i.e. "synthetic") polymers.

A number of techniques have been developed to improve the physical and mechanical properties of native starch. One approach has involved converting native starch into a thermoplastically processible starch (TPS). For example, PCT/WO90/05161 discloses a process for producing TPS which comprises melt mixing starch having a low water content with a plasticiser such as glycerol. Although the physical and mechanical properties of such TPS polymers are substantially better than native starch, these polymers typically have poor water resistance and can therefore only be used in limited applications.

The water resistance of TPS polymers can be improved by blending these polymers with other thermoplastic polymers such as polyolefins. However, the biodegradability of these TPS polymer blends can be adversely affected due to the fact that polymers that are usually blended with the TPS are relatively non-biodegradable. Furthermore, the physical and mechanical properties of such TPS polymer blends are often quite poor due to the immiscibility of polymers employed in making the blends. In particular, polysaccharides such as starch and TPS are relatively hydrophilic, whereas most synthetic thermoplastic polymers are relatively hydrophobic. Accordingly, melt blending of starch or TPS with other thermoplastic polymers typically results in the formation of a multi-phase morphology having a high interfacial tension which can negatively impact on the physical and mechanical properties of the resulting polymer blend.

Attempts have been made to improve the biodegradability and the physical and mechanical properties of TPS polymer blends. For example, U.S. Pat. No. 5,844,023 discloses a biologically degradable polymer mixture comprising a biodegradable polyester, a TPS and a "polymer phase mediator". The polymer mixture is said to be readily biodegradable and the polymer phase mediator is said to promote coupling of hydrophobic polyester phase and hydrophilic TPS phase thereby improving the physical and mechanical properties of the polymer mixture. A biodegradable polymer composition disclosed in the US reference is formed through melt mixing a thermoplastic polyester with TPS. In this case, the polymer phase mediator is said to be formed in situ during this melt mixing process through transesterification between some of the polyester and some of the TPS. Formation of the phase mediator in this way is considered difficult to control, and the process is believed to provide a limited reduction in the interfacial tension between the immiscible polymer phases.

Despite representing an advance in the field of biodegradable polymers, due to only a marginal improvement in phase coupling, the physical and mechanical properties of such polyester/TPS blends are still relatively poor compared with conventional petroleum based polymers. To compensate for this, such polyester/TPS blends are typically prepared with quite low levels of starch. However, lowering the starch content of the composition increases its cost and can reduce its biodegradability.

Accordingly, there remains a need to develop alternative biodegradable polymer compositions having good physical and mechanical properties.

SUMMARY OF THE INVENTION

The present invention provides a method of preparing a biodegradable polymer composition, said method comprising melt mixing a first biodegradable polyester and a masterbatch, wherein said masterbatch has been formed separately by melt mixing in the presence of a transesterification catalyst a polysaccharide, a second biodegradable polyester and a biodegradable polymer having pendant carboxylic acid groups.

In one embodiment of the invention, the masterbatch provides the only source of polysaccharide that is melt mixed with the first biodegradable polyester to form the biodegradable polymer composition.

It has now been found that a polymer composition having excellent biodegradability and physical and mechanical properties can be prepared using a masterbatch that has been formed separately through melt mixing a polysaccharide, a biodegradable polyester and a biodegradable polymer having pendant carboxylic acid groups in the presence of a transesterification catalyst.

Accordingly, the invention also provides a masterbatch suitable for use in preparing a biodegradable polymer composition, said masterbatch comprising the following components and/or their transesterification reaction product: (a) polysaccharide; (b) biodegradable polyester; (c) biodegradable polymer having pendant carboxylic acid groups; and (d) transesterification catalyst.

Preferably, the total mass of components (a)-(d) and/or their transesterification reaction product in the masterbatch represents at least 50 wt. % of the total mass of the masterbatch.

The invention further provides a method of preparing a masterbatch suitable for use in the manufacture of a biodegradable polymer composition, said method comprising melt mixing in the presence of a transesterification catalyst a polysaccharide, a biodegradable polyester and a biodegradable polymer having pendant carboxylic acid groups.

The invention also provides the use of the masterbatch in the manufacture of a biodegradable polymer composition, said masterbatch being melt mixed with a biodegradable polyester.

In an embodiment of the invention, use of the masterbatch in the manufacture of a biodegradable polymer composition is such that the masterbatch provides the only source of polysaccharide that is melt mixed with the polyester to form the biodegradable polymer composition.

It has been found that a masterbatch in accordance with the invention can be readily melt mixed with a biodegradable polyester to afford a biodegradable polymer composition that exhibits improved compatibility between its constituent components, relative to biodegradable polymer compositions comprising a polysaccharide and a polyester that are prepared by conventional means. The improved compatibility between components in polymer compositions of the invention is at least in part believed to be responsible for the compositions excellent physical and mechanical properties. The improved compatibility also enables the compositions to be formulated with a relatively high polysaccharide content and this can advantageously reduce the cost of the composition and improve its biodegradability.

Without wishing to be limited by theory, it is believed that the biodegradable polymer having pendant carboxylic acid groups facilitates transesterification between the polysaccharide and the biodegradable polyester during preparation of the masterbatch. In particular, it is believed that the pendant carboxylic acid groups positioned along the polymeric backbone of the biodegradable polymer interact through hydrogen bonding and/or condensation/transesterification reactions with the polysaccharide to promote the formation and/or retention of a highly non-crystalline or destructured form of the polysaccharide. In this form, the polysaccharide can more readily undergo transesterification with the biodegradable polyester to thereby minimise the presence of in the masterbatch of uncompatibilised polysaccharide. This in turn is believed to give rise to the improved compatibility between the constituent components of the masterbatch and biodegradable polymer composition of the invention.

Further aspects of the invention are described below.

DETAILED DESCRIPTION OF THE INVENTION

Those skilled in the art will appreciate that the term "biodegradable" does not have a universal definition. For avoidance of any doubt, the term "biodegradable" used herein in association with the term "polymer", "polymer composition" or specific polymer materials such as a "polysaccharide" and "polyester", is intended to denote a material that meets the biodegradability criteria specified in EN 13432 or ASTM 6400. In other words, a polymer is considered to be biodegradable if, upon exposure to a composting environment, 90% of it disintegrates into particles having an average size of less than 2 mm within twelve weeks, and after six months at least 60% of it, in the case of ASTM 6400, or at least 90% of it, in the case of EN 13432, has degraded into carbon dioxide and/or water. Preferably, biodegradable polymer compositions in accordance with the invention will meet the more stringent biodegradability criteria set forth in EN 13432.

As used herein, reference to a biodegradable polymer having "pendant carboxylic acid groups" is intended to mean that the carboxylic acid groups (i.e. —COOH) are present as substituents along the polymeric backbone of a biodegradable polymer. The acid groups may be attached directly to the polymeric back bone or attached to the backbone by a spacer group such as for example an alkyl group.

The method of preparing the biodegradable polymer composition in accordance with the invention comprises melt mixing a first biodegradable polyester and a masterbatch as described. Melt mixing may be performed using techniques and equipment well known in the art. Preferably, melt mixing is achieved using continuous extrusion equipment, such as twin screw extruders, single screw extruders, other multiple screw extruders or Farell continuous mixers. Melt mixing is conducted for sufficient time and at a suitable temperature to promote intimate blending between the first biodegradable polyester and the masterbatch. Those skilled in the art will appreciate that melt mixing is generally performed within a suitable temperature range and that this range will vary depending upon the nature of the polymer(s) being processed.

An advantage of preparing a biodegradable polymer composition in accordance with the invention is that melt mixing may be performed at a minimum melt processing temperature. This is in contrast with methods where a polysaccharide (or TPS) per se is directly melt mixed with a polyester to prepare a biodegradable polymer composition (e.g. as in U.S. Pat. No. 5,844,023). Using this latter type of methodology, it will typically be necessary to employ temperatures above the minimum melt processing temperature to promote transesterification between the polysaccharide (or TPS) and polyester and form compatibiliser in situ. A notable disadvantage of performing the melt mixing process at a temperature above the minimum processing temperature is that the bulk polyester and polysaccharide (or TPS) can thermally degrade. This can have the effect of reducing the physical and mechanical properties of the resulting polymer composition.

Given that there is no need to form compatibiliser in situ during melt mixing of the first polyester and masterbatch in accordance with the invention, high melt mixing temperatures can advantageously be avoided.

As used herein, the expression "minimum melt processing temperature" of a polymer or polymer composition is considered to be the lowest temperature or temperature range at which that polymer or composition can be maintained to enable it to be effectively melt processed while minimising or avoiding thermal degradation of the polymer or composition. The minimum melt processing temperature will of course vary depending upon the materials being processed, and this can be readily determined by a person skilled in the art.

In some cases it may be desirable to vent or apply vacuum to the melt mixing process to allow volatile components such as water to be removed from the polymer melt.

The first biodegradable polyester used in accordance with the invention may be any biodegradable polyester that can be subjected to melt mixing. Examples of suitable biodegradable polyesters include, but are not limited to, polycaprolactone (PCL) as sold by Union Carbide under the trade name Tone™ (e.g. Tone P-300, P-700, P-767 and P-787 having a weight average molecular weight of about 10,000, 40,000, 43,000 and 80,000, respectively), or those sold by Solvay under the trade name CAPA 6800 and CAPA FB100 having a molecular weight of 80,000 and 100,000 Daltons, respectively; polylactic acid (PLA) as sold under the trade name Natureworks™ PLA by Cargill; polyhydroxy butyrate (PHB) as sold under the trade name Biocycle™ or Biomer™ by Biomer, Germany; polyethylene succinate (PES) and polybutylene succinate (PBS) as sold under the trade name Bionolle™ by Showa Hi Polymer Company (e.g. Bionolle™ 1001 (PBS) and Bionelle™ 6000 (PES)); polybutylene adipate (PBA) as sold under the trade name Skygreen™ SG100 from SK Chemicals Korea; poly(butylene adipate/terephthalate) (PBAT) aliphatic/aromatic copolyesters such as Ecoflex™ by BASF, or EnPOL™ G8060 and EnPOL™ 8000 by Ire Chemical Ltd of Seoul; poly(hydroxybutyrate valerate) (PHBV) by Metabolix Inc. USA; cellulose acetate butyrate (CAB) and cellulose acetate propionate (CAP) supplied by Eastman Chemicals; or combinations thereof.

When preparing the biodegradable polymer composition in accordance with the invention, the first biodegradable polyester will generally be used in an amount ranging from about 5 wt. % to about 90 wt. %, preferably in an amount ranging from about 20 wt. % to about 80 wt. %, more preferably in an amount ranging from about 40 wt. % to about 70 wt. %, and the masterbatch will generally be used in an amount ranging from about 10 wt. % to about 95 wt. %, preferably in an amount ranging from about 20 wt. % to about 80 wt. %, more preferably in an amount ranging from about 30 wt. % to about 60 wt. %, relative to the total mass of the first biodegradable polyester and the masterbatch, and such that the total mass of these two components represents at least 65 wt. %, preferably at least 70 wt. %, more preferably at least 75 wt. %, most preferably at least 80 wt. %, of the total mass of the biodegradable polymer composition. Where the total mass of the biodegradable polymer composition is not made up entirely of the first biodegradable polyester and the masterbatch, the remaining components of the composition will include one or more additives described in more detail below.

In one embodiment of the invention, the first biodegradable polyester and the masterbatch make up 100 wt. % of the biodegradable polymer composition.

When preparing the biodegradable polymer composition, the first biodegradable polyester is melt mixed with the masterbatch. As used herein, the term "masterbatch" is intended to mean a composition comprising a carrier polymer and one or more agents, where the concentration of the one or more agents is higher than desired in a final product, and which composition is subsequently let down in a base polymer to produce the final product having the desired amount of the one or more agents. With particular reference to the present invention, the masterbatch may comprise a biodegradable polyester and a biodegradable polymer having pendant carboxylic acid groups as carrier polymers and a polysaccharide as an agent.

As will be discussed in more detail below, by virtue of the manner in which it is prepared the masterbatch is believed to also comprise a reaction product derived from at least some of the polysaccharide undergoing transesterification with the biodegradable polyester. Without wishing to be limited by theory, it may also be that in preparing the masterbatch all of the polysaccharide undergoes a degree of transesterification with the biodegradable polyester. The biodegradable polymer having pendant carboxylic acid groups may also take part in such reactions. This of course needs to be taken into account when construing the term "masterbatch" as it is defined directly above. Thus, the transesterification reaction product between the polysaccharide and the biodegradable polyester (and also possibly the biodegradable polymer having pendant carboxylic acid groups) is to be understood as taking the dual role of both carrier polymer and agent. In other words, as used herein the term "masterbatch" is to be construed such that it embraces the situation where aforementioned carrier polymer and agent is in fact a reaction product between the polysaccharide, the biodegradable polyester and possibly the biodegradable polymer having pendant carboxylic acid groups.

Accordingly, the masterbatch may be described as comprising a polysaccharide, a biodegradable polyester, a biodegradable polymer having pendant carboxylic acid groups, a transesterification catalyst and/or a reaction product derived from melt mixing these components in the presence of the transesterification catalyst.

In the method of preparing the biodegradable polymer composition, the masterbatch is formed separately. By being "formed separately" is meant that the masterbatch is prepared in advance and is subsequently melt mixed with the first biodegradable polyester. The masterbatch can therefore be prepared and conveniently stored for future use. Alternatively, the masterbatch may be prepared and then immediately combined with the first biodegradable polyester in a melt mixing process.

The masterbatch used in accordance with the invention is prepared by melt mixing, in the presence of a transesterification catalyst, a second biodegradable polyester, a polysaccharide and a biodegradable polymer having pendant carboxylic acid groups. Melt mixing may be performed using equipment and techniques hereinbefore described.

The second biodegradable polyester used in preparing the masterbatch may be selected as described above in respect of the first biodegradable polyester. The second biodegradable polyester may be the same as or different from the first biodegradable polyester. Unless otherwise stated, for convenience the first and second biodegradable polyesters will hereinafter simply be referred to as the "biodegradable polyester".

Suitable types of biodegradable polymer having pendant carboxylic acid groups that may be used in preparing the masterbatch include, but are not limited to, ethylene acrylic acid (EAA) copolymer, poly(EAA-vinyl alcohol) (EAAVA), poly(acrylic acid) (PAA), poly(methacrylic acid) (PMA), ethylene-methacrylic acid copolymers (EMAA), and poly(acrylamide-acrylic acid) (PAAA).

In preparing the masterbatch, the biodegradable polymer having pendant carboxylic acid groups will generally used in an amount ranging from about 5 wt. % to about 35 wt. %, preferably from about 10 wt. % to about 25 wt. %, more preferably from about 15 wt. % to about 25 wt. %, relative to the total mass of component used in preparing the masterbatch.

The biodegradable polymer having pendant carboxylic acid groups will generally have a melt flow index (MFI, as measured at 190° C. using 2.16 Kg weight) of greater than about 15, preferably ranging from about 15 to about 50, more preferably from about 15 to about 20.

The biodegradable polymer having pendant carboxylic acid groups will generally have a % acid value (as determined by ASTM D4094-00) of greater than about 7%, preferably greater than or equal to about 9%.

The polysaccharide used in preparing the masterbatch may be any polysaccharide that can be subjected to melt mixing. The polysaccharide preferably has a water content below about 1 wt. %, more preferably below about 0.5 wt. %. Suitable polysaccharides include, but are not limited to, starch, glycogen, chitosan and cellulose.

A preferred polysaccharide for use in preparing the masterbatch is starch. Starch is a particularly convenient polysaccharide in that it is relatively inexpensive, it is derived from a renewable resource and it is readily available. Starch is found chiefly in seeds, fruits, tubers, roots and stem pith of plants, and is basically a polymer made up of repeating glucose groups linked by glucosidic linkages in the 1-4 carbon positions. Starch consists of two types of alpha-D-glucose polymers: amylose, a substantially linear polymer with molecular weight of about $1 \times 10^5$; and amylopectin, a highly branched polymer with very high molecular weight of the order $1 \times 10^7$. Each repeating glucose unit typically has three free hydroxyl groups, thereby providing the polymer with hydrophilic properties and reactive functional groups. Most starches contain 20 to 30% amylose and 70 to 80% amylopectin. However, depending on the origin of the starch the ratio of amylose to amylopectin can vary significantly. For example, some corn hybrids provide starch with 100% amylopectin (waxy corn starch), or progressively higher amylose content ranging from 50 to 95%. Starch usually has a water content of about 15 wt. %. However, the starch can be dried to reduce its water content to below 1%.

Starch typically exists in small granules having a crystallinity ranging from about 15 to 45%. The size of the granules may vary depending upon the origin of the starch. For example, corn starch typically has a particle size diameter ranging from about 5 to 40 μm, whereas potato starch typically has a particle size diameter ranging from about 50 to 100 μm. In this "native" form, starch can be difficult to melt process. To improve the melt processability of starch, the starch may be converted to a TPS by means well known in the art. Thus, TPS may be used as the polysaccharide in accordance with the invention. For example, native starch may be melt processed with one or more plasticisers such as water, glycerine, di- or ethyleneglycol, trimethylene glycol, sorbitol or other low molecular weight polyether compounds.

Water is an excellent plasticiser for the manufacture of TPS. However, due to its relatively low boiling point, the presence of water above about 1 wt. % in TPS can cause an undesirable degree of volatilisation of water during melt mixing. Furthermore, the presence of too much water during the preparation of the masterbatch or biodegradable polymer composition can cause an undesirable degree of hydrolysis of the polyester.

Preferred plasticisers for the manufacture of TPS include glycerol and/or sorbitol. These, and other suitable plasticisers are typically used in an amount ranging from about 5 wt. % to about 50 wt. %, preferably in an amount ranging from about 10 wt. % to about 40 wt. %, more preferably in an amount ranging from about 10 wt. % to about 30 wt. %, relative to the total mass of native starch.

Chemically modified starch may also be used as the polysaccharide in accordance with the invention. Chemically modified starch includes, but is not limited to, oxidised starch, etherificated starch, esterified starch, cross-linked starch or a combination of such chemical modifications (e.g., etherificated and esterified starch). Typically, modified starch is prepared by reacting the hydroxyl groups of the polymer with one or more reagents. The degree of reaction, often referred to the degree of substitution (DS), can significantly alter the physicochemical properties of the modified starch compared with the corresponding native starch. The DS for a native starch is designated as 0, and can range up to 3 for a fully substituted modified starch. Where the substituent groups have hydrophobic character, a DS approaching 3 can afford a modified starch that is relatively hydrophobic in character. Such modified starches can be more readily melt blended with the second biodegradable polyester, relative to native starch.

A chemically modified starch may also be converted to TPS by melt mixing it with plasticiser as hereinbefore described. In this case, the aforementioned amounts of plasticiser used will be relative to the total mass of the modified starch.

Starches that are chemically modified are preferably etherificated or esterified. Suitable etherificated starches include, but are not limited to, those which are substituted with ethyl and/or propyl groups. Suitable esterified starches include, but are not limited to, those that are substituted with acetyl, propanoyl and/or butanoyl groups.

Etherificated starches may be prepared using techniques well known in the art, such as reacting starch with an appropriate alkylene oxide. Esterified starches may also be prepared using techniques well known in the art, such as reacting starch with appropriate anhydride, carboxylic acid or acid chloride reagents.

When starch is used as the polysaccharide, it may be in its native form, in the form of a TPS, a chemically modified starch, or a combination such starches may be used. In all cases, it is preferable that the water content of the starch is less than about 1 wt. %, preferably less than about 0.5 wt. %.

It will of course also be possible to form TPS during the melt mixing process used to prepare the masterbatch. For example, the method of producing the masterbatch may comprise melt mixing native starch and/or chemically modified starch, plasticiser, biodegradable polyester, a biodegradable polymer having pendant carboxylic acid groups and a transesterification catalyst.

Where a TPS is used in preparing the masterbatch and/or a plasticiser per se is used in preparing the masterbatch, the presence of plasticiser during the melt mixing process is believed to further enhance the formation and/or retention of a highly non-crystalline or destructured form of the polysaccharide.

Preferred types of starch materials include, but are not limited to, corn starch, potato starch, wheat starch, soybean starch, tapioca starch, high-amylose starch or combinations thereof.

Preferably, the starch is corn starch, and more preferably the corn starch is corn starch acetate such as that supplied by the Shanghai Denaturalization Starch Company, ShangHai, (DS>0.08%, moisture content<14%).

The transesterification catalyst used in preparing the masterbatch functions to lower the melt processing temperature at which the matserbatch components may be melt mixed and undergo reaction compared with that which would be required to promote the same degree of reaction in the absence of the catalyst. While the catalyst is referred to as a "transesterification" catalyst, those skilled in the art will appreciate from the nature of components being melt mixed to prepare the masterbatch that other reactions such as condensation and ester exchange reactions may also take place. Thus, for convenience it is to be understood that reference herein to the term "transesterification" is intended to embrace other mechanisms of reaction that can occur between ester, alcohol and acid groups such as ester exchange and condensation reactions.

Suitable transesterification catalysts include, but are not limited to, alkali metal hydroxides such as sodium and/or potassium hydroxide. The type of catalysts employed preferably has low ecotoxicity. Antimony based transesterification catalysts will therefore not generally be used. The catalyst may be provided in solution, for example in an aqueous solution.

Those skilled in the art will appreciate that transesterification between the polysaccharide and the biodegradable polyester or the biodegradable polymer having pendant carboxylic acid groups will typically result in the formation of a block co-polymer. The block co-polymer(s) may function as a compatibiliser for any polysaccharide, biodegradable polyester and biodegradable polymer having pendant carboxylic acid groups that have not undergone transesterification. Thus, irrespective of whether only part or all of the polysaccharide undergoes transesterification with the biodegradable polyester and/or the biodegradable polymer having pendant carboxylic acid groups, the masterbatch is believed to present as a homogenous composition at least in terms of these three components.

As a compatibiliser, the block co-polymer(s) formed during preparation of the masterbatch can be seen to comprise a section(s) or region(s) that is miscible with the polysaccharide and a section(s) or region(s) that is miscible with the biodegradable polyester and/or the biodegradable polymer having pendant carboxylic acid groups. The block co-polymer(s) can therefore function to decrease the interfacial tension between and promote the coupling of immiscible polysaccharide and polyester phases that may be present in the masterbatch or the biodegradable polymer composition formed from the masterbatch.

As indicated above, when preparing the masterbatch the presence of the biodegradable polymer having pendant carboxylic acid groups is believed to promote the formation of such block co-polymers, which in turn are believed to improve the compatibility between constituent components of the biodegradable polymer composition of the invention.

The masterbatch is therefore believed to comprise a highly compatibilised mixture and/or transesterification reaction product of polysaccharide, biodegradable polyester and the biodegradable polymer having pendant carboxylic acid groups. However, the masterbatch per se may not exhibit sufficient physical and mechanical properties for use in many applications. To provide a biodegradable polymer composition with improved physical and mechanical properties, particularly in the areas of tensile strength and tensile elongation, the masterbatch can be melt mixed with the first biodegradable polyester. Excellent characteristics of such polymer compositions are believed to be derived at least in part from properties imparted by the first biodegradable polyester and the ability of the masterbatch to form a compatible blend with the first biodegradable polyester.

The ability of the masterbatch to form a relatively compatible blend with the first biodegradable polyester is believed to represent an important advantage of the present invention. In particular, conventional methods for preparing biodegradable polyester compositions typically involve melt mixing a polysaccharide and a biodegradable polyester, optionally with a compatibiliser, and promoting coupling between the hydrophobic polyester phase and the hydrophilic polysaccharide phase during that melt mixing step. In contrast, when preparing the polymer composition in accordance with the invention the masterbatch can and preferably does provide the only source of polysaccharide that is melt mixed with the first biodegradable polyester, and this polysaccharide is already well compatibilised and/or has undergone transesterification with a biodegradable polyester and/or a biodegradable polymer having pendant carboxylic acid groups. Thus, components being melt mixed during formation of the biodegradable composition may already be relatively compatible. This simplifies and improves the efficiency of preparing the composition and is believed to provide a composition having excellent physical and mechanical properties.

However, in the case where the masterbatch does not provide the only source of polysaccharide that is melt mixed with the first biodegradable polyester in preparing the biodegradable polymer composition in accordance with the invention, the well compatibilised masterbatch can advantageously in itself function as a compatabiliser for the further source of polysaccharide and the first biodegradable polyester.

Compatibilisation between the components present in the masterbatch and the biodegradable polymer composition can be readily determined experimentally by imaging the composition and/or by measuring the physical and mechanical properties of the composition. For example, the masterbatch or composition may be cryogenically frozen, fractured then view under a scanning electron microscope to evaluate the level of adhesion between the dispersed phase and the continuous phase.

Where the polysaccharide used to prepare the masterbatch is native starch, as indicated above transesterification between the starch, the biodegradable polyester and possibly the biodegradable polymer having pendant carboxylic acid groups can be further enhanced by introducing during melt mixing a plasticiser such as glycerol and/or sorbitol. In this case, the plasticiser will generally be used in amounts hereinbefore described. Preferably, this will result in an amount of plasticiser ranging from 10 wt. % to about 20 wt. %, relative to the total mass of the masterbatch.

Where a mixture of glycerol and sorbitol plasticisers are used, it is preferable that they be used in a weight ratio ranging from about 2:1 to about 3:1.

Transesterification between the starch, the biodegradable polyester and possibly the biodegradable polymer having pendant carboxylic acid groups can also be further enhanced by using chemically modified starch. In this case, it is preferable to use esterified starch as hereinbefore described having a DS ranging from about 0.1 to about 1, more preferably ranging from about 0.5 to about 1. It may also be preferable to introduce with the modified starch during melt mixing a plasticiser as hereinbefore described.

As part of the method of preparing the masterbatch, it may also be desirable to use a relatively low weight average molecular weight biodegradable polyester (e.g. ranging from about 30,000 to about 40,000) in order to further enhance transesterification of the polysaccharide. In this case, it is preferred that the first biodegradable polyester has a weight average molecular weight ranging from about 80,000 to about 1000,000.

When preparing the biodegradable polymer composition in accordance with the invention, there is no particular limitation on the polysaccharide content of the masterbatch. However, the masterbatch will generally be prepared using a relatively high proportion of polysaccharide in order to maximise the amount of polysaccharide that is ultimately introduced to the biodegradable polymer composition via the masterbatch.

When preparing the biodegradable polymer composition in accordance with the invention, the masterbatch used will generally be prepared separately by melt mixing about 20 wt. % to about 70 wt. %, preferably about 40 wt. % to about 65 wt. %, more preferably about 45 wt. % to about 60 wt. % of the polysaccharide, about 20 wt. % to about 70 wt. %, preferably about 25 wt. % to about 50 wt. %, more preferably about 25 wt. % to about 40 wt. % of the second biodegradable polyester, about 5 wt. % to about 50 wt. %, preferably about 10 wt. % to about 40 wt. %, more preferably about 15 wt. % to about 30 wt. % of the biodegradable polymer having pendant carboxylic acid groups, and about 0.1 wt. % to about 1 wt. %, preferably about 0.1 wt. % to about 0.5 wt. %, more preferably about 0.15 wt. % to about 0.5 wt. % of the transesterification catalyst, relative to the total mass of the polysaccharide, the second biodegradable polyester, the biodegradable polymer having pendant carboxylic acid groups, and the transesterification catalyst, and such that the total mass of these four components and/or their transesterification reaction product represents at least 50 wt. %, preferably at least 60 wt. %, more preferably at least 65 wt. %, most preferably at least 70 wt. %, of the total mass of the masterbatch. Where the total mass of the masterbatch is not made up entirely of the polysaccharide, the second biodegradable polyester, the biodegradable polymer having pendant carboxylic acid groups, and the transesterification catalyst, the remaining components of the masterbatch will include one or more additives such as plasticiser hereinbefore described and other additives described in more detail below.

The invention also provides a masterbatch suitable for use in preparing a biodegradable polymer composition, said masterbatch comprising the following components and/or their transesterification reaction product: (a) about 20 wt. % to about 70 wt. %, preferably about 40 wt. % to about 65 wt. %, more preferably about 45 wt. % to about 60 wt. % of polysaccharide; (b) about 20 wt. % to about 70 wt. %, preferably about 25 wt. % to about 50 wt. %, more preferably about 25 wt. % to about 40 wt. % of biodegradable polyester; (c) about 5 wt. % to about 50 wt. %, preferably about 10 wt. % to about 40 wt. %, more preferably about 15 wt. % to about 30 wt. % of the biodegradable polymer having pendant carboxylic acid groups, and (d) 0.1 wt. % to 1 wt. %, preferably 0.1 wt. % to 0.5 wt. %, more preferably 0.15 wt. % to 0.5 wt. % of transesterification catalyst; relative to the total mass of the polysaccharide, the second biodegradable polyester, the biodegradable polymer having pendant carboxylic acid groups, and the transesterification catalyst, and such that the total mass of these four components and/or their transesterification reaction product represents at least 50 wt. %, preferably at least 60 wt. %, more preferably at least 65 wt. %, most preferably at least 70 wt. %, of the total mass of the masterbatch. Where the total mass of the masterbatch is not made up entirely of the polysaccharide, the second biodegradable polyester, the biodegradable polymer having pendant carboxylic acid groups, and the transesterification catalyst, the remaining components of the masterbatch will include one or more additives such as plasticiser hereinbefore described and other additives described in more detail below.

The invention further provides a masterbatch suitable for use in preparing a biodegradable polymer composition, said masterbatch comprising the following components and/or their transesterification reaction product: (a) 45 wt. % to 70 wt. %, preferably 50 wt. % to 65 wt. %, more preferably 50 wt. % to 60 wt. % of polysaccharide; (b) 10 wt. % to 50 wt. %, preferably 10 wt. % to 40 wt. %, more preferably 10 wt. % to 30 wt. % of biodegradable polyester; (c) 5 wt. % to 50 wt. %, preferably 10 wt. % to 40 wt. %, more preferably 15 wt. % to 30 wt. % of the biodegradable polymer having pendant carboxylic acid groups, and (d) 0.1 wt. % to 1 wt. %, preferably 0.1 wt. % to 0.5 wt. %, more preferably 0.15 wt. % to 0.5 wt. % of transesterification catalyst; relative to the total mass of the polysaccharide, the biodegradable polyester, the biodegradable polymer having pendant carboxylic acid groups, and the transesterification catalyst, and such that the total mass of these four components and/or their transesterification reaction product represents at least 60 wt. %, preferably at least 65 wt. %, more preferably at least 70 wt. %, most preferably at least 75 wt. % of the total mass of the masterbatch. Where the total mass of the masterbatch is not made up entirely of the polysaccharide, the biodegradable polyester, the biodegradable polymer having pendant carboxylic acid groups, and the transesterification catalyst and/or their transesterification reaction product, the remaining components of the masterbatch will include additives such as plasticiser hereinbefore described and other additives described in more detail below.

The invention further provides a method of preparing a masterbatch suitable for use in the manufacture of a biodegradable polymer composition, said method comprising melt mixing about 20 wt. % to about 70 wt. %, preferably about 40 wt. % to about 65 wt. %, more preferably about 45 wt. % to about 60 wt. % of the polysaccharide, about 20 wt. % to about 70 wt. %, preferably about 25 wt. % to about 50 wt. %, more preferably about 25 wt. % to about 40 wt. % of the second biodegradable polyester, about 5 wt. % to about 50 wt. %, preferably about 10 wt. % to about 40 wt. %, more preferably about 15 wt. % to about 30 wt. % of the biodegradable polymer having pendant carboxylic acid groups, and about 0.1 wt. % to about 1 wt. %, preferably about 0.1 wt. % to about 0.5 wt. %, more preferably about 0.15 wt. % to about 0.5 wt. % of the transesterification catalyst, relative to the total mass of the polysaccharide, the second biodegradable polyester, the biodegradable polymer having pendant carboxylic acid groups, and the transesterification catalyst, and such that the total mass of these four components and/or their transesterification reaction product represents at least 50 wt. %, preferably at least 60 wt. %, more preferably at least 65 wt. %, most preferably at least 70 wt. %, of the total mass of the masterbatch. Where the total mass of the masterbatch is not made up entirely of the polysaccharide, the second biodegradable polyester, the biodegradable polymer having pendant carboxylic acid groups, and the transesterification catalyst, the remaining components of the masterbatch will include one or more additives such as plasticiser hereinbefore described and other additives described in more detail below.

The invention also provides a method of preparing a masterbatch suitable for use in the manufacture of a biodegradable polymer composition, said method comprising melt mixing 45 wt. % to 70 wt. %, preferably 50 wt. % to 65 wt. %, more preferably 50 wt. % to 60 wt. % of polysaccharide, 10 wt. % to 50 wt. %, preferably 10 wt. % to 40 wt. %, more preferably 10 wt. % to 30 wt. % of a biodegradable polyester, about 5 wt. % to about 50 wt. %, preferably about 10 wt. % to about 40 wt. %, more preferably about 15 wt. % to about 30 wt. % of the biodegradable polymer having pendant carboxylic acid groups, and 0.1 wt. % to 1 wt. %, preferably 0.1 wt. % to 0.5 wt. %, more preferably 0.15 wt. % to 0.5 wt. % of transesterification catalyst, relative to the total mass of the polysaccharide, the biodegradable polyester and the transesterification catalyst, and such that the total mass of these four components and/or their transesterification reaction product represents at least 60 wt. %, preferably at least 65 wt. %, more preferably at least 70 wt. %, most preferably at least 75 wt. % of the total mass of the masterbatch. Where the total mass of the masterbatch is not made up entirely of the polysaccharide, the biodegradable polyester, the biodegradable polymer having pendant carboxylic acid groups, and the transesterification catalyst, the remaining components of the masterbatch will include one or more additives such as plasticiser hereinbefore described and other additives described in more detail below.

The masterbatch may be provided in any suitable form that can be subsequently melt mixed with a biodegradable polyester to form the biodegradable polymer composition in accordance with the invention. Generally, the masterbatch will be provided in the form of pellets.

The biodegradable polymer composition, masterbatch and methods for the preparation thereof in accordance with the invention may comprise a step of introducing, respectively, one or more additives provided that such additives do not adversely impact on the biodegradability of the polymer composition. Preferably, the additives are only included in the masterbatch. Such additives may include fillers such as calcium carbonate, silicone dioxide, talc, clays such as montmorillonite, titanium dioxide and natural fibres such as wood powder, paper pulp and/or other cellulosic materials; pigments; anti-static agents; stabilisers; blowing agents; processing aids such as lubricants; fluidity enhancers; anti-retrogradation additives; plasticisers as hereinbefore described; and antiblocking agents such as silicon dioxide.

Common lubricants include, but are not limited to, calcium stearate, steric acid, magnesium stearate, sodium stearate, oxidised polyethylene, oleamide, stearamide and erucamide. A lubricant will generally be used in an amount to provide for an amount ranging from about 0.2 wt. % to 0.7 wt. % in the biodegradable polymer composition.

Common fluidity enhancers include, but are not limited to, monoglycerides, glucose fat diethylene glycol dinitrate and products sold under the trade name Siben-60 or Siben-80. A fluidity enhancer will generally be used in an amount to provide for an amount ranging from about 1 wt. % to about 2 wt. % in the biodegradable polymer composition.

A common anti-retrogradation additive includes, but is not limited to, a distilled monoglyceride. Anti-retrogradation additives will generally be used in an amount to provide for an amount ranging from about 0.5 wt. % to about 1 wt. % in the biodegradable polymer composition. An additive such as distilled monoglyceride is also believed to assist with the dispersability and stabilisation of the polysaccharide.

An antiblocking agent such as silicon dioxide may be used in an amount to provide for an amount ranging from about 0.25 wt. % to 0.5 wt. % in the biodegradable polymer composition.

The method of preparing the biodegradable polymer composition in accordance with the invention may also comprise melt mixing with the masterbatch and the biodegradable polyester a second or further polysaccharide. A suitable second or further polysaccharide may be selected from the polysaccharides hereinbefore described. In this case, the polysaccharide will generally be used in an amount up to about 40 wt. %, preferably up to about 30 wt. %, more preferably no more than about 20 wt. %, relative to the total mass of the biodegradable polyester composition.

To minimise an undesirable degree of hydrolysis occurring during melt mixing, the first biodegradable polyester, the polysaccharide, the masterbatch and any other additives used in preparing the polymer composition will preferably each have a water content of less than about 2 wt. %, more preferably of less than about 1 wt. %, most preferably of less than about 0.6 wt. %.

In a preferred embodiment of the invention, the method of preparing the biodegradable polymer composition comprises melt mixing about 5 wt. % to about 90 wt. % of a first biodegradable polyester and about 10 wt. % to about 95 wt. % of a masterbatch, relative to the total mass of the first biodegradable polyester and the masterbatch, and such that the total mass of these two components represents at least 95 wt. % of the total mass of the biodegradable polymer composition, wherein said masterbatch has been formed separately by melt mixing about 20 wt. % to about 70 wt. % of a polysaccharide and about 10 wt. % to about 70 wt. % of a second biodegradable polyester, about 5 wt. % to about 25 wt. % of the biodegradable polymer having pendant carboxylic acid groups, about 5 wt. % to about 50 wt. % of plasticiser in the presence of about 0.1 wt. % to about 1 wt. % of a transesterification catalyst, relative to the total mass of the polysaccharide, the second biodegradable polyester, the transesterification catalyst, the plasticiser and the biodegradable polymer having pendant carboxylic acid groups, and such that the total mass of these five components represents at least 95 wt. % of the total mass of the masterbatch.

The biodegradable polymer composition prepared in accordance with the invention has excellent physical and mechanical properties and is readily biodegradable. The composition can be conveniently processed using conventional polymer converting techniques such as extrusion, injection moulding, and thermoforming. The composition is particularly suited for manufacturing film and sheet that may be converted into packaging materials. In this case, PCL, PBAT, PHBV, PES and PBS are preferably used as the biodegradable polyester. The composition may also be used in the manufacture of food utensils such as cups, plates, cutlery and trays. In this case, the biodegradable polyester used in preferably PLA and CAB.

The invention also provides a sheet or film formed from the biodegradable polymer composition prepared in accordance with the invention.

The biodegradable polymer composition may be provided in any suitable form that can be processed into a desired product such as sheet or film. Generally, the composition will be provided in the form of pellets.

Embodiments of the invention are further described with reference to the following non-limiting examples.

Example 1

Preparation of Masterbatch from Starch and PBS (MB-1)

35 kg of acetic ester starch (DS of 0.5) having a water content of less than 1 wt. %, 14 kg of glycerol, 6 kg of sorbitol, 0.8 kg of distilled monoglyceride, 20 kg of ethylene acrylic acid (EEA) (9% acid, melt flow index=20), 15 kg PBS (by Mitsubishi, Japan), 0.3 kg calcium stearate, 0.2 kg steric acid, and 0.12 kg sodium hydroxide dissolved in a minimum amount of water were melt mixed in a ZSK-65 Twin Screw Extruder (L/D=48). Prior to melt mixing these components, the solid materials were dry blended first in a high speed mixer and the liquid materials then added to provide for a uniform distribution of all components. The temperature profile of the extruder was set at 75° C./140° C./175° C./175° C./160° C./130° C. The rotation speed of the screw was set at 200 rpm. A vacuum of −0.06 to −0.08 bar was applied during extrusion. The polymer melt was extruded as a strand, air cooled and cut into pellets. The masterbatch was found to have a melt flow index of >4 g/10 min at 190° C. with 2.16 kg, and a water content of <0.2 wt. %.

Example 2

Preparation of a Biodegradable Polymer Composition

A composition consisting of 45 wt. % MB-1, 35 wt. % PCL and 20 wt. % PBAT was first dry blended and then melt mixed using a ZSK-65 Twin Screw Extruder with a rotational speed of 220 rpm. The temperature profile of the extruder was set at 80° C./130° C./165° C./165° C./155° C./130° C. A vacuum of −0.04 to −0.05 bar was applied during extrusion. The resulting extrudate was water cooled and cut into pellets and was found to have a melt flow index of 10 g/10 min, at 190° C. with 2.16 kg.

The polymer composition prepared in accordance with Example 2 was blown into film having a thickness of approximately 15 micron. The resulting film was tested according to ASTM D-882 and found to exhibit a tensile strength at break of >15 MPa and an elongation at break of >600%. The film was also found to fully comply with the biodegradability requirements of EN 13432.

A range of films formed from comparative commercially available polysaccharide/polyester polymer compositions sold under the trade name Mater-Bi, BioCorp, EcoWorks and Eco Film were found to have an elongation at break when tested in accordance with ASTM D-882 of <400%.

Example 3

Preparation of a Biodegradable Polymer Composition

A composition consisting of 45 wt. % MB-1 and 55 wt. % PHBV was first dry blended and then melt mixed using a ZSK-65 Twin Screw Extruder with a rotational speed of 220 rpm. The temperature profile of the extruder was set at 80° C./130° C./165° C./165° C./155° C./130° C. A vacuum of −0.04 to −0.05 bar was applied during extrusion. The resulting extrudate was water cooled and cut into pellets and was found to have a melt flow index of 10 g/10 min, at 190° C. with 2.16 kg.

The polymer composition prepared in accordance with Example 3 was blown into film having a thickness of approximately 15 micron. The resulting film was tested according to ASTM D-882 and found to exhibit a tensile strength at break of >15 MPa and an elongation at break of >500%. The film was also found to fully comply with the biodegradability requirements of EN 13432.

Example 4

Preparation of a Biodegradable Polymer Composition

A composition consisting of 30 wt. % MB-1 and 70 wt. % PLA was first dry blended and then melt mixed using a ZSK-65 Twin Screw Extruder with a rotational speed of 220 rpm. The temperature profile of the extruder was set at 90° C./160° C./185° C./185° C./175° C./165° C. A vacuum of −0.04 to −0.05 bar was applied during extrusion. The resulting extrudate was water cooled and cut into pellets and was found to have a melt flow index of 8-10 g/10 min, at 190° C. with 2.16 kg.

The polymer composition prepared in accordance with Example 4 was formed into a cast extruded sheet. The resulting sheet was tested according to ASTM D-882 and found to exhibit a tensile strength at break of >20 MPa, an elongation at break of >350%, and a dart drop impact strength (in accordance with GB 1843) of >20 kJ/m². The sheet was also found to fully comply with the biodegradability requirements of EN 13432.

Example 5

Preparation of a Biodegradable Polymer Composition

A composition consisting of 28 wt. % MB-1, 8 wt. % PCL and 65 wt. % PLA was first dry blended and then melt mixed using a ZSK-65 Twin Screw Extruder with a rotational speed of 220 rpm. The temperature profile of the extruder was set at 90° C./160° C./185° C./185° C./175° C./165° C. A vacuum of −0.04 to −0.05 bar was applied during extrusion. The resulting extrudate was water cooled and cut into pellets and was found to have a melt flow index of 8-10 g/10 min, at 190° C. with 2.16 kg.

The polymer composition prepared in accordance with Example 5 was formed into a cast extruded sheet. The resulting sheet was tested according to ASTM D-882 and found to exhibit a tensile strength at break of >15 MPa, an elongation at break of >400%, and a dart drop impact strength (in accordance with GB1843) of >20 kJ/m². The sheet was also found to fully comply with the biodegradability requirements of EN 13432.

Example 6

Preparation of a Biodegradable Polymer Composition

A composition consisting of 40 wt. % MB-1, 10 wt. % PCL and 50 wt. % PLA was first dry blended and then melt mixed using a ZSK-58 Twin Screw Extruder with a rotational speed of 200 rpm. The temperature profile of the extruder was set at 90° C./160° C./185° C./185° C./175° C./165° C. A vacuum of −0.04 to −0.05 bar was applied during extrusion. The resulting extrudate was water cooled and cut into pellets and was found to have a melt flow index of 15-20 g/10 min, at 190° C. with 2.16 kg.

The polymer composition prepared in accordance with Example 6 was formed into a rigid sheet material. The resulting sheet was tested according to ASTM D-882 and found to exhibit a tensile strength at break (machine direction) of ≧20 MPa, a tensile strength at break (transverse direction) ≧15 MPa, an elongation at break (machine direction) of ≧250%, and an elongation at break (transverse direction) of ≧150%. The sheet was also found to fully comply with the biodegradability requirements of EN 13432.

Example 7

Preparation of a Biodegradable Polymer Composition

A composition consisting of 65 wt. % biodegradable aromatic/aliphatic copolyester PBAT (e.g. Enpol G8060), 10% MB-1, 20 wt. % calcium carbonate (2 micron particle size, micronized oyster shells) and 5 wt. % titanate coupling agent, was first dry blended and then melt mixed using a ZSK-65 Twin Screw Extruder with a rotational speed of 220 rpm. The temperature profile of the extruder was set at 80° C./130° C./165° C./165° C./155° C./130° C. A vacuum of 0.04 to 0.05 bar was applied during extrusion. The resulting extrudate was water cooled and cut into pellets and was found to have a melt flow index of 12 g/10 min, at 190° C. with 2.16 kg.

The polymer composition prepared in accordance with Example 7 was blown into film having a thickness of approximately 20 micron. The resulting film was tested according to ASTM D-882 and found to exhibit a tensile strength at break of >15 MPa and an elongation at break of >600%. The film was also found to fully comply with the biodegradability requirements of EN 13432.

Example 8

Preparation of Masterbatch from Starch and PBAT (MB-2)

35 kg of acidic ester starch (DS of 0.5) having a water content of <1 wt. %, 20 kg of glycerol, 20 kg of ethylene-acrylic acid (9% acid, melt flow index=20), 12 kg PBAT, 1 kg of distilled monoglyceride, 0.16 kg sodium hydroxide dissolved in a minimum amount of water, 0.3 kg calcium stearate, and 0.2 kg stearic acid were melt mixed in a ZSK-65 Twin Screw Extruder (L/D=48). Prior to melt mixing these components, the solid materials were dry blended in a high speed mixer and then the liquid materials then added to provide for a uniform distribution of all components. The polymer melt was extruded as a strand, air cooled and cut into pellets.

Example 9

Preparation of Biodegradable Polymer Composition

A composition consisting of 50 wt. % MB-2, 30 wt. % PCL and 20 wt. % PBAT was first dry blended and then melt mixed using a ZSK-65 Twin Screw Extruder with a rotational speed of 220 rpm. The temperature profile of the extruder was set at 80° C./130° C./165° C./165° C./155° C./130° C. A vacuum of −0.04 to −0.05 bar was applied during extrusion. The resulting extrudate was water cooled and cut into pellets and was found to have a melt flow index of 10 g/10 min at 190° C. with 2.16 kg.

The polymer composition prepared in accordance with Example 9 was blown into film having a thickness of approximately 15 micron. The resulting film was tested according to ASTM D-882 and found to exhibit a tensile strength at break of >14 MPa and an elongation at break of >400%. The film was also found to fully comply with the biodegradability requirements of EN 13432.

EN 13432 is a performance standard entitled "Packaging: Requirements for packaging recoverable through composting and biodegradation; Test scheme and evaluation criteria for the final acceptance of packaging".

EN 13432 is underpinned by the following test methods: ISO 16929 (12 week disintegration test in compost), ISO 14855 (in vessel composting test for $CO_2$ evolution), heavy metals, compost quality, volatile solids and the OECD 208 A germination test. The European Norm EN 13432 and the American Society for Testing and Materials (ASTM International) D6400-99 standards all define biodegradability in respect of a time period of 6 months. In the case of EN 13432 a material is deemed biodegradable if it will break down to the extent of at least 90% to $H_2O$ and $CO_2$ and biomass within a period of 6 months. While for the ASTM D-6400 it is necessary for the material to break down to the extent of at least 60%.

Both standards state that in order for a product to be compostable the following criteria need to be met:

1) Disintegration: the ability to fragment into non-distinguishable pieces after screening and safely support bio-assimilation and microbial growth;

2) Inherent Biodegradation: conversion of carbon to carbon dioxide to the level of 60%, over a period of 180 days (as specified ASTM D6400-99) and 90% in 180 days for the European standard (EN 13432);

3) Safety: that there is no evidence of any eco-toxicity in finished compost and soils and it can support plant growth; and 4) Toxicity: that heavy metal concentrations are less than 50% recommended values.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The claims defining the invention are as follows:

1. A method of preparing a biodegradable polymer composition, said method comprising melt mixing a first biodegradable polyester and a masterbatch, wherein said masterbatch has been formed separately by melt mixing in the presence of a transesterification catalyst a polysaccharide, a second biodegradable polyester and an ethylene acrylic acid copolymer.

2. The method according to claim 1, wherein the masterbatch provides the only source of polysaccharide that is melt mixed with the first biodegradable polyester to form the biodegradable polymer composition.

3. The method according to claim 1, wherein the first biodegradable polyester is used in an amount ranging from about 5 wt. % to about 90 wt. %, and the masterbatch is used in an amount ranging from about 10 wt. % to about 95 wt. %, relative to the total mass of the first biodegradable polyester and the masterbatch, and such that the total mass of these two components represents at least 65 wt. % of the total mass of the biodegradable polymer composition.

4. The method according to claim 1, wherein the masterbatch is formed separately by melt mixing about 20 wt. % to about 70 wt. % of the polysaccharide, about 20 wt. % to about 70 wt. %, of the second biodegradable polyester, about 5 wt. % to about 50 wt. % of the ethylene acrylic acid copolymer, and about 0.1 wt. % to about 1 wt. % of the transesterification catalyst, relative to the total mass of the polysaccharide, the second biodegradable polyester, the ethylene acrylic acid copolymer, and the transesterification catalyst, and such that the total mass of these four components and/or their transesterification reaction product represents at least 50 wt. % of the total mass of the masterbatch.

5. The method according to claim 1, wherein the polysaccharide is selected from starch, glycogen, chitosan and cellulose.

6. The method according to claim 5, wherein the polysaccharide is starch and the starch is selected from native starch, thermoplastically processible starch (TPS) and chemically modified starch.

7. The method according to claim 1, wherein the first and second biodegradable polyesters are each independently selected from polycaprolactone, polylactic acid, polyhydroxy butyrate, polyethylene succinate, polybutylene adipate terephthate, polyhydroxy butyrate valerate, polybutylene succinate, polybutylene adipate, cellulose acetate butyrate, and cellulose acetate propionate.

8. The method according to claim 1, wherein the transesterification catalyst is an alkali metal hydroxide.

9. The method according to claim 1, wherein the masterbatch is formed separately by melt mixing the polyester polysaccharide, the second biodegradable polyester, the ethylene acrylic acid copolymer and a plasticiser in the presence of the transesterification catalyst.

10. The method according to claim 9, wherein the plasticiser is selected from glycerol and/or sorbitol.

11. The method according to claim 1, wherein the biodegradable polymer composition prepared meets biodegradability criteria set forth in EN 13432.

12. A biodegradable polymer composition prepared in accordance with the method of claim 1.

13. The biodegradable polymer composition according to claim 12 which meets biodegradability criteria set forth in EN 13432.

* * * * *

UNITED STATES PATENT AND TRADEMARK OFFICE
CERTIFICATE OF CORRECTION

| | | |
|---|---|---|
| PATENT NO. | : 8,067,485 B2 | Page 1 of 1 |
| APPLICATION NO. | : 12/375435 | |
| DATED | : November 29, 2011 | |
| INVENTOR(S) | : Changping Chen | |

It is certified that error appears in the above-identified patent and that said Letters Patent is hereby corrected as shown below:

Title Page

Item (75) Inventor, please correct "Chen Changping, Jiangsu (CN)" to read
-- Changping Chen, Jiangsu (CN) --.

Signed and Sealed this
Tenth Day of January, 2012

David J. Kappos
*Director of the United States Patent and Trademark Office*